Nov. 19, 1957  R. J. HOWLAND  2,813,344
ROOFER'S HELPER
Filed July 19, 1956  2 Sheets-Sheet 1
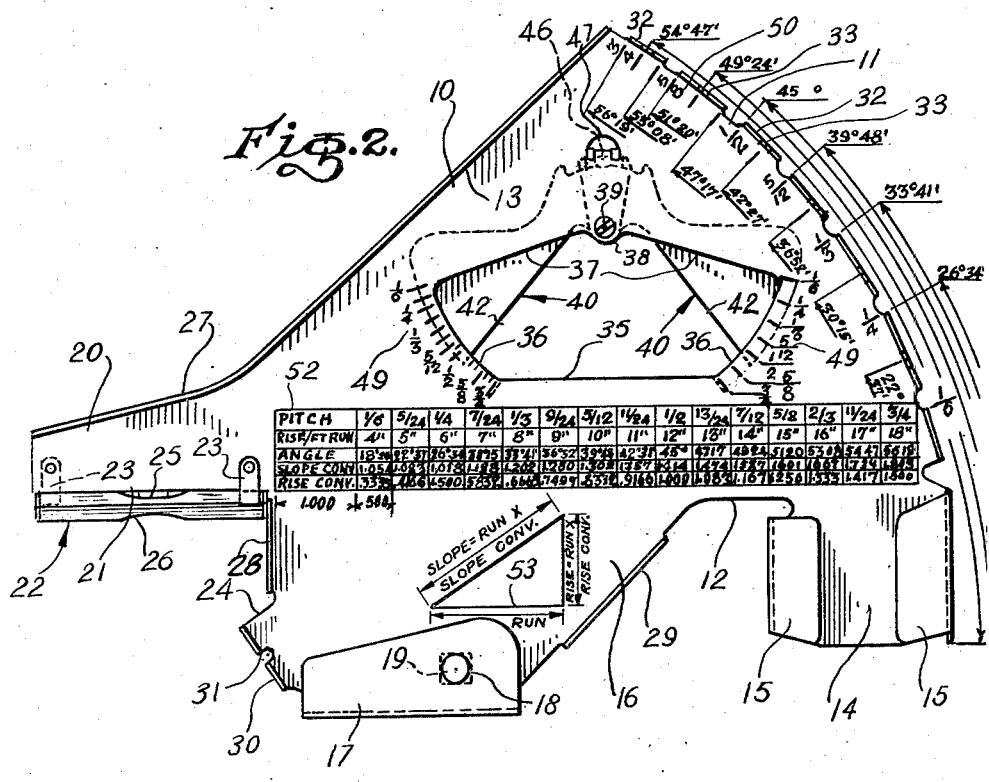
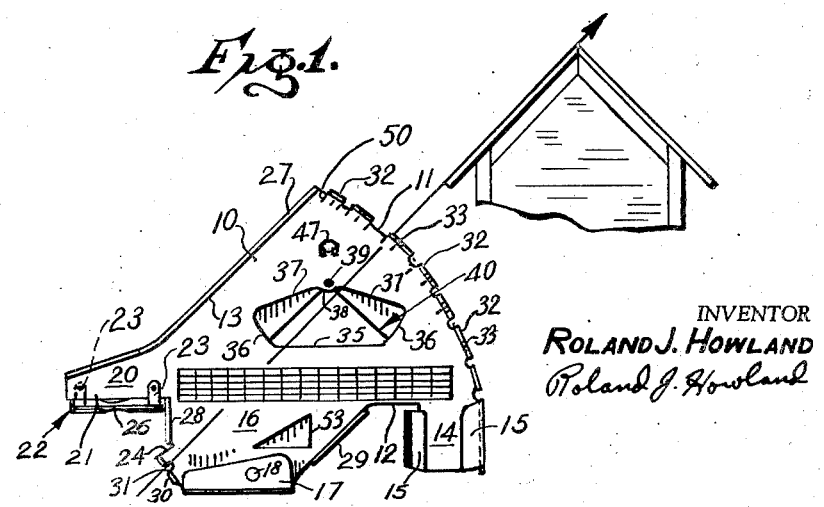
INVENTOR
ROLAND J. HOWLAND
Roland J. Howland

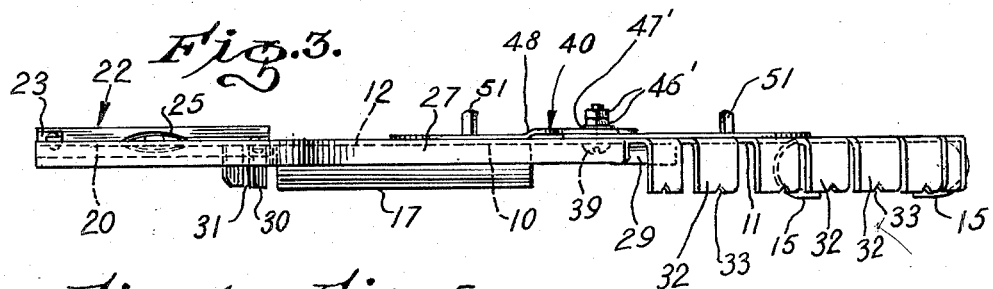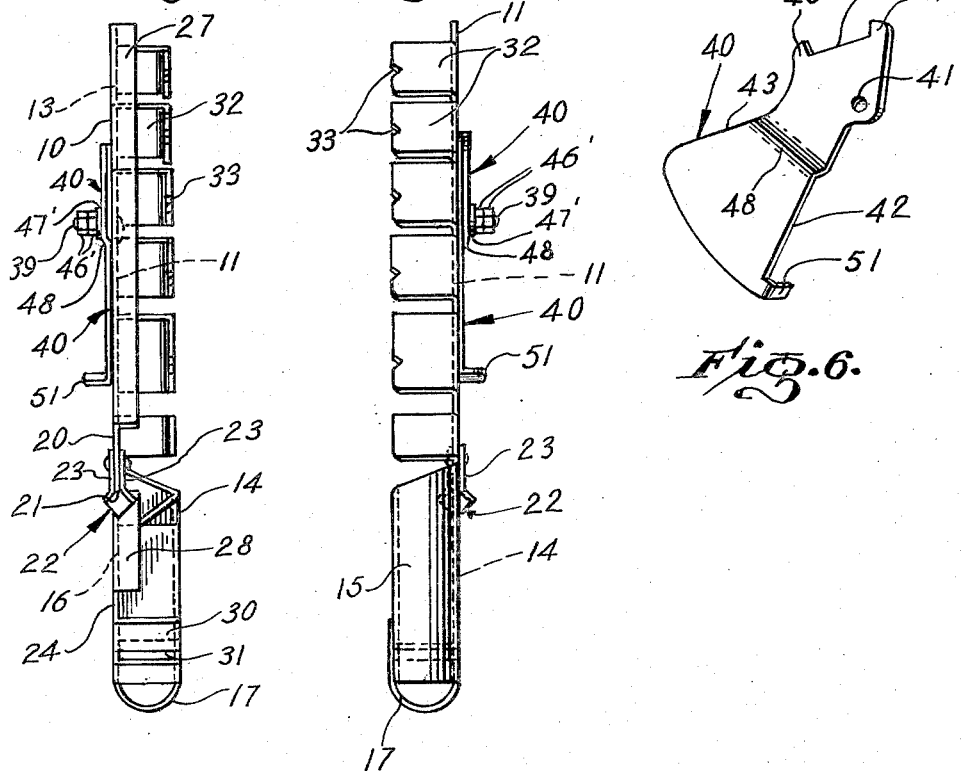

United States Patent Office 2,813,344
Patented Nov. 19, 1957

2,813,344

ROOFER'S HELPER

Roland J. Howland, Locke, N. Y.

Application July 19, 1956, Serial No. 598,940

4 Claims. (Cl. 33—70)

This invention relates to instruments for determining roof pitches and heights of objects.

It is the principal object of the present invention to provide an easy, efficient means for determining roof pitches from the ground with greater accuracy and for calculating roof slope length and the height of gables rises.

It is another object of the present invention to provide an instrument of the above type which may also be used as a leveling instrument when used with a tripod.

It is still another object of the present invention to provide an instrument of the above type which is particularly adapted for roofing or siding salesmen who wish to make a close estimate of the materials required and without the necessity of leaving the ground.

Other objects of the invention are to provide an instrument bearing the above objects in mind which is of simple construction, has a minimum number of parts, is inexpensive to manufacture and efficient in operation.

For other objects and for a better understanding of the invention, reference may be had to the following detailed description taken in connection with the accompanying drawing, in which:

Figure 1 is a front elevational view of a preferred embodiment of the present invention shown in operative use;

Fig. 2 is an enlarged front elevational view thereof in detail;

Fig. 3 is a top plan view as taken looking down on Fig. 2;

Fig. 4 is an end elevational view looking from the left of Fig. 2;

Fig. 5 is an end elevational view looking from the right of Fig. 2; and

Fig. 6 is a perspective view shown alone of one of the shutters forming a part of the invention.

Referring now more in detail to the drawing, 10 represents a segment plate of substantially triangular shape having a circular edge 11 representing the segment of the circle and a horizontal lower edge 12 as well as the inclined straight edge 13, substantially as illustrated.

The segment plate 10 along the lower edge 12 adjacent the curved edge 11 is integrally formed with a depending plate 14 integrally formed along the opposite vertical edges with the flange portions 15 of U-shaped cross section whereby to provide a convenient handle for the instrument.

The plate 10 along the lower horizontal edge 12 at the other end thereof is integrally formed with a depending trapezoidal plate 16 integrally formed along its lower horizontal edge with the U-shaped flange 17 to provide a second handle, the outer portion of the flange 17 being provided with a circular opening 18 aligned with a square opening 19 provided in the plate 16.

The plate 10 at the other end is integrally formed with the frusto-triangular extension 20 having a horizontal lower edge 21 below which is mounted a liquid level indicated generally at 22 by means of the oppositely disposed mounting lugs 23, the plate 16 being cut away at an angle to the edge 21, as at 24. The level 22 is provided with the upper and lower openings 25 and 26 and may be read from above or below.

The upper edges of the segment plate 10 and the frusto-triangular extension 20 are integrally formed at right angles thereto with the continuous reinforcement flange 27, while the plate 16 is integrally formed at right angles with the reinforcement flanges 28 and 29, substantially as illustrated.

The other inclined side of the trapezoidal plate 16 is integrally formed at right angles thereto with the flange 30 having a central slot 31 or peephole.

The circular edge 11 of the plate 10 is integrally formed at right angles thereto with the angularly spaced flanges 32, each having along its upper edge a central notch 33 (Fig. 2). The opposite horizontal edges of the flanges 32 as well as the notches 33 are adapted to be sighted through the peephole 31.

The segment plate 10 is provided with a central cutout having a lower horizontal edge 35 and segmental circular edges 36 at the opposite ends which are connected by the inwardly and upwardly extending straight edges 37, as shown in Fig. 2. A semicircular lug 38 extends into the cutout and connects the inner edges of the edges 37, serving to mount the screw 39 which extends rearwardly through the plate.

A pair of shutters indicated generally at 40 (Fig. 6) are provided and are rotatably mounted on the rear face of the plate 10 by means of the screw 39, each being provided with the mounting opening 41 for that purpose. Each of the shutters includes a converging straight edge 42 and 43 which intersect at the center of the mounting opening 41 as well as a trapezoidal shaped slot 44, the ends of which intersect at the center of the mounting opening 41 and subtend an arc of 37 degrees. The trapezoidal shaped slot 44 defines a pair of stops 45 which are adapted to abut a downwardly bent lug 46 defined by the U-shaped slot 47 provided in the plate 10 above the screw 39 (Fig. 2). The shutters 40 are rotatably mounted on the rear face of the segment plate 10 by means of the screw 39 and the nuts 46', the shutters retaining their position by means of a spring washer 47' provided on the nut intermediate the shutters and the nuts, as will be obvious. Only one of the shutters is offset away from the segment plate 10, as at 48 to provide for the overlapping relationship of the inner ends of the shutters and to permit the outer ends to lie in the same plane for cooperative action with the cutout in the segment plate. The straight edges 42 of the shutters are adapted to cooperate with the scales 49 provided on the segment plate at each end of the central cutout therein as shown in Fig. 2. The segment plate 10 adjacent the flange 32 is provided with the scale 50 which has divisions along the opposite vertical edges of the flanges 32 and in radial alignment with the notches 33, shown in Fig. 2. Each of the shutters is integrally formed at right angles thereto at the outer end of the straight edge 42 with the tab 51 to facilitate their movement.

Some roofs may be more easily viewed from the side, while others are better approached from the gable end. The present invention is designed to work with equal accuracy from a side view of a roof, or from a gable end view.

For determining pitch from the side of the building, the peep slot 31 is employed, ranging over the radial graduations, graduated consecutively from four inch rise to the foot run, through eighteen inch rise to the foot run. The level 22 located above the peep slot 31 is conveniently located for glancing upwards while sighting the pitch. The level has openings in the bottom as well as the top and the level's bubble centering lines project downward through the liquid to work satisfactorily on the bottom side. Using this means of determining the pitch, the user stands with the eye lining up the lower edge of the roof with the peak of the roof. He then sights through and over the lower edge of the peep slot 31, glancing upwardly at the level. Pitch graduation lining up with the roof is the required pitch. Pitches of 1/6, 1/4, 1/3, 5/12, 1/2, 5/8, and 3/4 are right on the upper edges of the turned up flanges 32. Pitches of 13/24 and 2/3 are read on the lower edges of the turned up flanges. Pitches of 5/24, 7/24, 9/24, 11/24, 7/12 and 17/24 are read on the notches 33 in the edge of the turned up flanges 32.

For determining the height of an object, the user sights through and over the lower edge of the peep slot 31 and across the 1/2 pitch graduation. Occasionally glancing up at the level, he backs away from the object until 1/2 pitch lines up with the top of the object. The height of the object is then the user's distance from the object plus the user's eye height from the ground.

For determining pitch from the gable end of the building, the instrument is used employing the opening in the segment plate 10 and the shutters 40 for lining up with the roof edges. The shutters may be worked and set independently of each other for lining up with a two pitched gable. The lug 46 of the segment plate stops the shutters slightly beyond their required travel. The variable heights of different buildings and the variable distances a person might stand from them present different appearances of pitch. The present invention has worked out the pitch graduations pertaining to the shutters, to accurately give the pitch of any height building, providing the user stands away twice the height of the building, minus twice his eye height from the ground. For all practical purposes and easy computation, ten feet is close enough. Standing his distance from the building, the user looks through the opening, adjusting the shutters to line up with the roof edges which in turn line up with the desired pitch graduation 49.

The chart 52 stamped on the segment plate 10 above the lower horizontal edge 12 covers all pitches consecutively from four inch to eighteen inch rise per foot run and gives the slope angle for each pitch in degrees and minutes. The chart gives the "slope" conversion factors for each pitch, three places to the right of the decimal point. The chart 52 also gives "rise" conversion factors for each pitch four places to the right of the decimal point.

The triangle 33 stamped in the trapezoidal plate 16 shows the "slope" equals run X slope conversion factor, and "rise" of gable run X rise conversion factor.

The flanges 15 provide a handle for the right hand grip. The flange 17 is for gripping between the thumb and the forefinger of the left hand when sighting through the peel slot 31. The hole 18 and rectangular opening 19 are for mounting on a tripod in combination with a 1/4 carriage bolt, wing nut and L-shaped bracket. When mounted on a tripod, the instrument may be used as a leveling instrument by sighting through and over the lower edge of the peep slot 31 in line with the lower edge of the forward handle 14, 15.

The present invention permits the level 22 to be in sight at all times and allows for accurate pitch reading from gable end view, regardless of the height of the building, which other instruments are incapable of doing. The present invention can be used for determining heights which other instruments cannot do, due to the fact that their plumb bob swings in the wrong direction for viewing. Furthermore, the present invention can be used as a leveling instrument, while other instruments are not capable of this function.

The instrument is preferably made of aluminum although a thinner brass or steel or perhaps plastic can be employed.

The invention is particularly adapted for roofing and siding salesmen and can be used part of the time on a camera tripod for the purpose of sighting a level line when desiring the height of a building, and the ground rises or drops away from the building. By this method, one can add or subtract the ground drop or rise to get the correct height of the building.

While various changes may be made in the detail construction, it shall be understood that such changes shall be within the spirit and scope of the present invention as defined by the appended claims.

What I claim as new and desire to protect by Letters Patent of the United States is:

1. An instrument for finding roof pitches and heights of objects comprising a substantially triangular segment plate having a circular edge representing the segment of a circle and a horizontal lower edge, handle means at the forward end of said lower edge below said circular edge, level means at the rear end of said segment plate along the lower horizontal edge thereof, said segment plate having a depending portion intermediate said level and handle means, second handle means along the lower edge of said depending portion, said depending portion rearwardly of said handle means having an upwardly extending edge integrally formed at right angles thereto with a flange having a central slot defining a peep slot, said peep slot being at the center of the circular edge, angularly spaced radiations emanating from said peep slot on said depending portion, said circular edge of said segment plate being integrally formed at right angles thereto with angularly spaced flanges having opposite vertical edges adapted to be aligned with said radiations and peep slot, each of said flanges at the top thereof having a notch of substantially V-shape having the lower edge thereof aligned with certain other of said radiations and peep slot, said segment plate adjacent said flanges being calibrated to provide the pitch of the roof, said level means comprising a liquid level having upper and lower openings with bubble centering lines projecting downwardly through the liquid to work with both the upper and lower openings.

2. An instrument for finding roof pitches and heights of objects comprising a substantially triangular segment plate having a circular edge representing the segment of a circle and a horizontal lower edge, handle means at the forward end of said lower edge below said circular edge, level means at the rear end of said segment plate along the lower horizontal edge thereof, said segment plate having a depending portion intermediate said level and handle means, second handle means along the lower edge of said depending portion, said depending portion rearwardly of said handle means having an upwardly extending edge integrally formed at right angles thereto with a flange having a central slot defining a peep slot, said peep slot being at the center of the circular edge, angularly spaced radiations emanating from said peep slot on said depending portion, said circular edge of said segment plate being integrally formed at right angles thereto with angularly spaced flanges having opposite vertical edges adapted to be aligned with said radiations and peep slot, each of said flanges at the top thereof having a notch of substantially V-shape having the lower edge thereof aligned with certain other of said radiations and peep slot, said segment plate adjacent said flanges being calibrated to provide the pitch of the roof, said depending portion having a lower horizontal edge integrally formed with a flange of U-shaped cross section comprising said second handle means, said flange having a circular opening aligned with a rectangular opening provided in said depending portion whereby to adapt the device for mounting on a tripod or the like.

3. An instrument for finding roof pitches and heights of objects comprising a substantially triangular segment plate having a circular edge representing the segment of a circle and a horizontal lower edge, handle means at the forward end of said lower edge below said circular edge, level means at the rear end of said segment plate along the lower horizontal edge thereof, said segment plate having a depending portion intermediate said level and handle means, second handle means along the lower edge of said depending portion, said depending portion rearwardly of said handle means having an upwardly extending edge integrally formed at right angles thereto with a flange having a central slot defining a peep slot, said peep slot being at the center of the circular edge, angularly spaced radiations emanating from said peep slot on said depending portion, said circular edge of said segment plate being integrally formed at right angles thereto with angularly spaced flanges having opposite vertical edges adapted to be aligned with said radiations and peep slot, each of said flanges at the top thereof having a notch of substantially V-shape having the lower edge thereof aligned with certain other of said radiations and peep slot, said segment plate adjacent said flanges being calibrated to provide the pitch of the roof, said segment plate having a central cutout having a horizontal lower edge, curved ends representing segments of a circle, and upwardly and inwardly extending straight upper edges, mounting means passing through the intersection of said upper edges, and a pair of shutters rotatably mounted on the rear face of said segment plate having converging opposite edges converging towards said mounting means, each of said shutters having a mounting opening located at the intersection of said straight edges and an upper enlarged portion having a trapezoidal shaped slot subtending to an arc of 37 degrees having its center located at the center of said mounting opening and defining opposite stops, stop means carried by said segment plate extending rearwardly therefrom adapted to abut said first stops whereby to limit the rotational movement of said shutters, one of said shutters being offset away from said segment plate at its inner end to provide for overlapping relationship of the inner ends of said shutters with the outer ends thereof lying in the same plane, and scales carried by said segment plate adjacent each of the curved ends of said central cutout, said scales being adapted to provide the pitch of any height building by cooperative reading with the inner edges of said shutters.

4. An instrument according to claim 3, said mounting means comprising a screw passing through the segment plate and the mounting openings in said shutters, nut means on the end of said screw and spring washer means on the said screw intermediate said shutters and nut means whereby to hold said shutters at any adjusted position.

References Cited in the file of this patent

UNITED STATES PATENTS

| | | |
|---|---|---|
| 373,627 | Wickham et al. | Nov. 22, 1887 |
| 1,153,098 | Miller | Sept. 7, 1915 |
| 2,378,770 | Horr | June 19, 1945 |
| 2,697,234 | Sturdevant | Dec. 21, 1954 |

FOREIGN PATENTS

| | | |
|---|---|---|
| 8,457 | Sweden | Jan. 30, 1897 |